H. P. JENKS.
KILN.
APPLICATION FILED JULY 8, 1916.

1,386,116.

Patented Aug. 2, 1921.
4 SHEETS—SHEET 1.

WITNESS:
Charles A. Math.

INVENTOR
Harford P. Jenks
BY John Lotka
ATTORNEY

H. P. JENKS.
KILN.
APPLICATION FILED JULY 8, 1916.
1,386,116.
Patented Aug. 2, 1921.
4 SHEETS—SHEET 2.
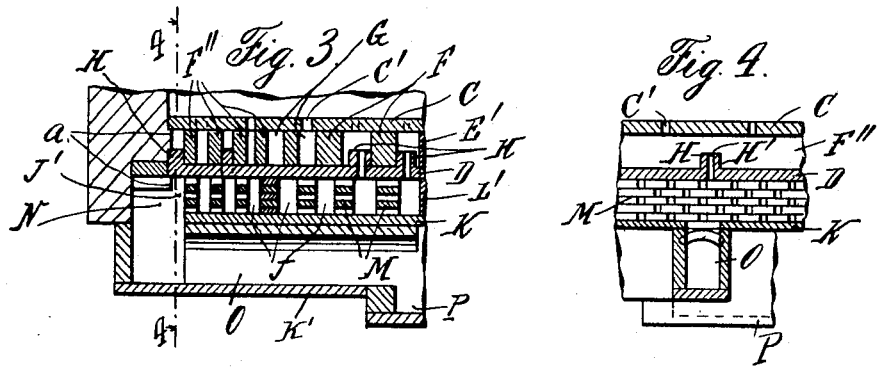
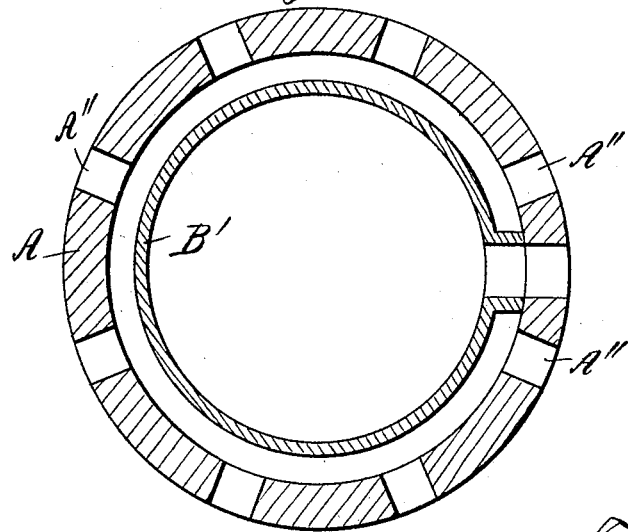
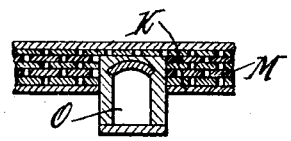
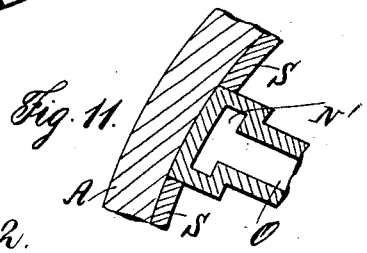
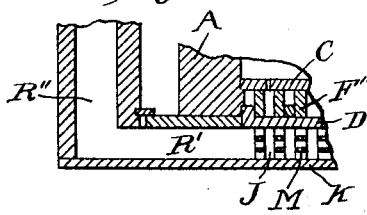
WITNESS:
Charles A. Mathé
INVENTOR
Harford P. Jenks
BY John Lotka
ATTORNEY

H. P. JENKS.
KILN.
APPLICATION FILED JULY 8, 1916.

1,386,116.

Patented Aug. 2, 1921.
4 SHEETS—SHEET 3.

WITNESS:
Charles A. Mathé

INVENTOR
Harford P. Jenks
BY John Lonka
ATTORNEY

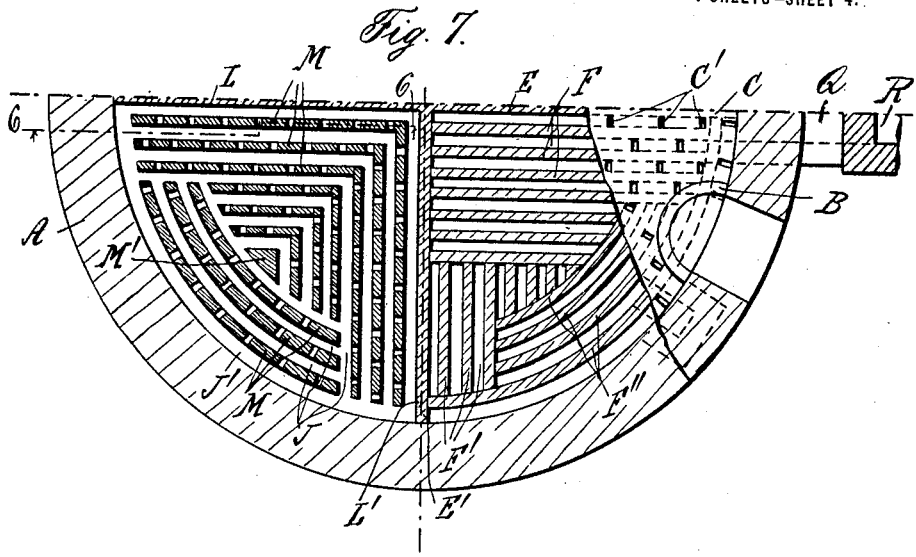
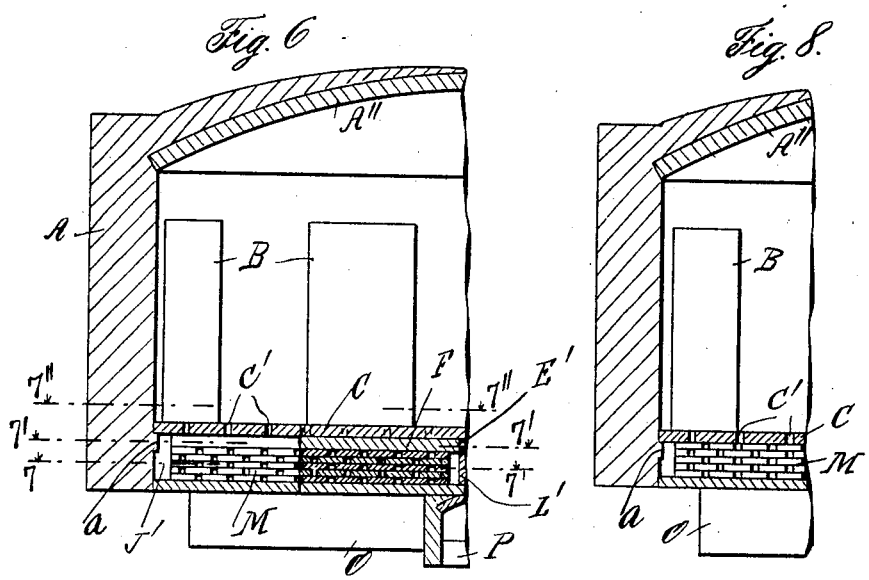

UNITED STATES PATENT OFFICE.

HARFORD P. JENKS, OF VIGO, OHIO.

KILN.

1,386,116.   Specification of Letters Patent.   Patented Aug. 2, 1921.

Application filed July 8, 1916. Serial No. 108,132.

*To all whom it may concern:*

Be it known that I, HARFORD P. JENKS, a citizen of the United States, and resident of Vigo, in the county of Ross and State of Ohio, have invented certain new and useful Improvements in Kilns, of which the following is a specification.

My invention relates to kilns, and particularly down-draft kilns for burning bricks or other ware commonly treated in kilns. The object of my present improvements is to secure a higher efficiency, especially as regards the ware in the lower portion of the kiln, so that the action may be as uniform as possible in the various parts of the kiln. Another object of my invention is to provide means, under the kiln floor, for preventing or minimizing the cooling effect of the ground on which the kiln is built, by providing a heat-storing device, or heat-reservoir, under the floor. Other features of my invention relate to means for preventing sand and the like from clogging the channels through which the hot gases pass. These features and others by which I aim to secure improved results, will now be described in detail with reference to the accompanying drawings, and the scope of my invention will then be pointed out in the appended claims.

Figure 1:
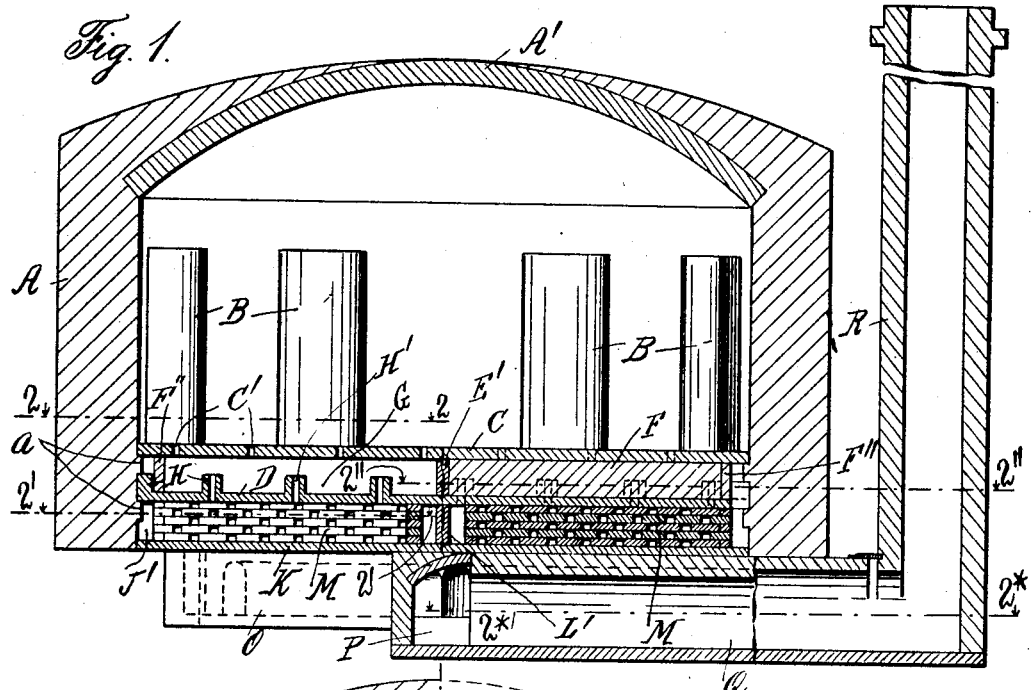
Figure 2:
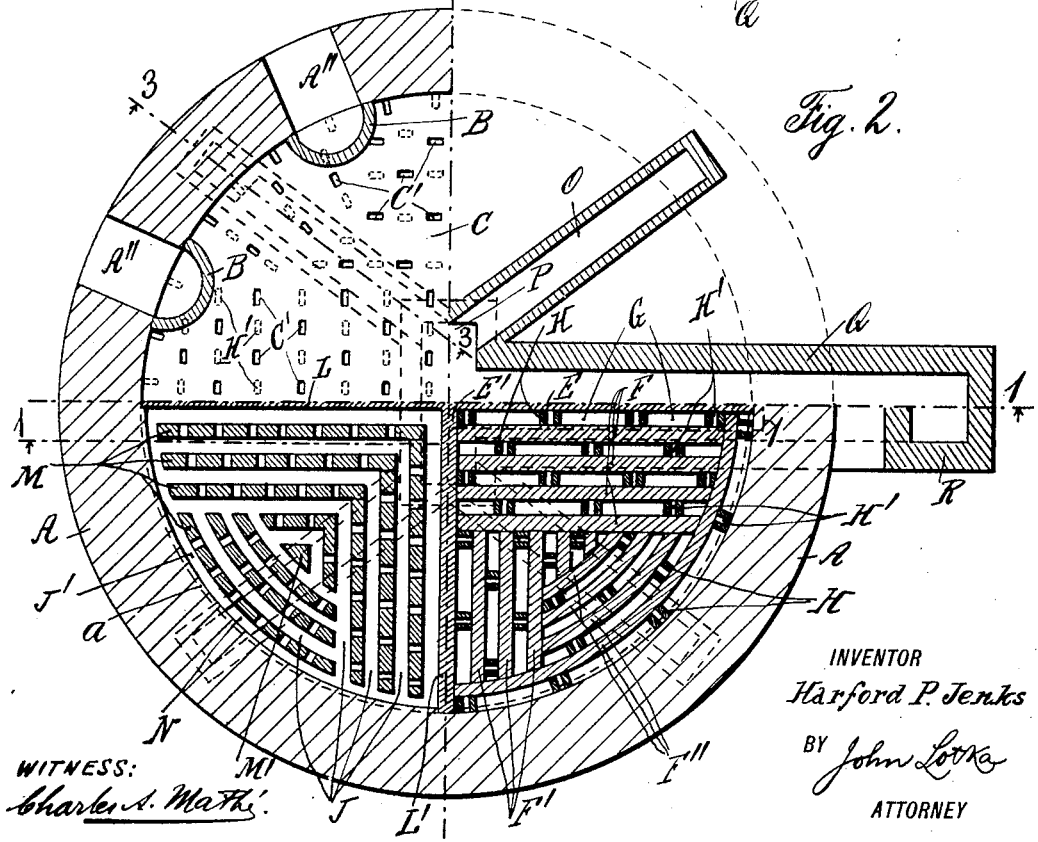
Figure 5:
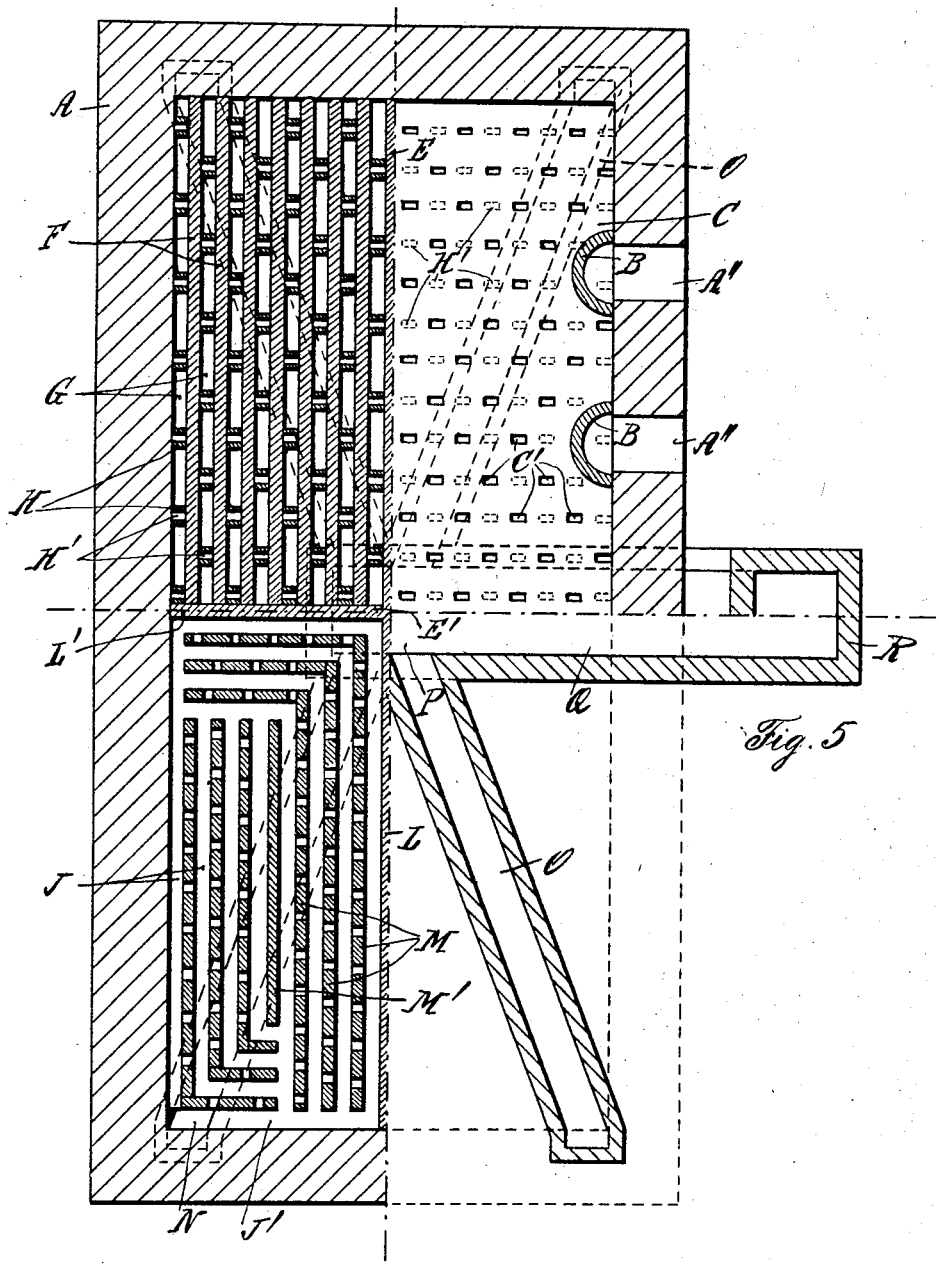

In said drawings, Figure 1 is a vertical section, on line 1—1—1 of Fig. 2, through a circular kiln embodying my invention; Fig. 2 shows a horizontal section of said circular kiln on four different planes, each of the four sectors of Fig. 2 being in a different plane; the upper left-hand sector is a section on line 2—2 of Fig. 1; the lower left-hand sector is a section on line 2'—2' of Fig. 1; the lower right-hand sector is a section on line 2"—2" of Fig. 1, and the upper right-hand sector is a section on line 2*—2* of Fig. 1; Fig. 3 is a partial vertical section of the same kiln, taken on line 3—3 of Fig. 2; Fig. 4 is a vertical detail section taken on line 4—4 of Fig. 3; Fig. 5 shows a horizontal section of a rectangular kiln embodying my invention, said section, in its four quadrants, being taken in different planes corresponding to the different planes on which the four sectors of Fig. 2 are taken; Fig. 6 is a partial vertical section, on line 6—6 of Fig. 7, showing another form of circular kiln embodying my invention; Fig. 7 is a horizontal section showing about one-half of the kiln shown in Fig. 6, the left-hand sector being a section on line 7—7 of Fig. 6, and the right-hand sector partly a section on line 7'—7' of Fig. 6 and partly a section on line 7"—7" of said figure; Fig. 8 is a vertical section similar to Fig. 6, showing a modification; Fig. 9 is a horizontal section of a further modification, taken at about the level indicated by the line 2—2 of Fig. 1; Fig. 10 is a vertical section of still another modification; Fig. 11 is a partial horizontal section illustrating the application of the construction of Figs. 1 to 4, to an existing circular kiln; and Fig. 12 is a partial vertical section of still another modification.

The particular form of my invention illustrated by Figs. 1 to 4 is a circular kiln having a surrounding wall A and an arched roof A', with furnaces A" located in or adjacent to the wall A. From these furnaces, bag-flues B lead to the interior of the kiln, discharging the hot gases into the upper portion of the kiln chamber. The kiln floor C is perforated, as at C', the location of the perforations being specified hereinafter. At a suitable distance below the floor C is located a sub-floor D, both floor and sub-floor being horizontal in the construction shown. The space between these two floors is subdivided into four compartments or sectors (of 90° each) by means of solid partitions E, E' extending diametrically, and at right angles to each other. Within each of these sectors or compartments, I arrange three sets of spaced solid partitions, the partitions of the same set being parallel to each other. One set of partitions, F, is adjacent to the partition E, and parallel thereto; the second set of partitions, F', is adjacent to the partition E' and parallel thereto, and therefore perpendicular to the partitions E and F; and the third set of partitions, F", is adjacent to the curved surrounding wall A, and parallel thereto, or in other words, concentric therewith. The partitions F" are curved, while the partitions F, F' are straight. In the particular construction shown, each of the partitions F extends from the outermost partition F" to the central or main partition E', while some of the partitions F' extend from the outermost partition F" to the last or shortest partition F, and the other partitions F' extend from said outermost or shortest partition F to the innermost partition F". The outermost partition F" extends from the main partition E to the other main partition E', and the other partitions F″ extend from the shortest partition F to the shortest of those partitions F′ which run to the outermost partition F″. Each of the solid partitions F, F′, F″ has both of its ends in contact (without any gaps) with solid partitions or walls. The perforations C′ in the floor C are so located as to lead to points between the partitions E, E′, F, F′, F″, or to points between the outermost partition F″ and the surrounding wall A. The outermost partitions F″ of the four sectors, in conjunction with the portions of the partitions E, E′ intervening between the adjacent ends of said outermost partitions F″, really constitute a continuous circular partition between the floor C and the sub-floor D, at a short distance inward from the surrounding wall A.

I have shown two furnaces above each of the compartments or sectors, these furnaces being at equal distances from each other, but of course, I do not restrict myself to this particular arrangement.

By means of the partitions F, F′, F″, in conjunction with the wall A and the main partitions E, E′, I form a series of channels or pockets G between the floor C and sub-floor D, and within these pockets, between the walls of the pocket, I provide blocks or projections H extending up from the bottom of the pocket, between two of the perforations C′, to about half the height of the pocket. These projections or blocks are made with perforations H′ extending vertically down through the sub-floor D, these perforations, as well as the projections H themselves, extending from one of the longitudinal walls of the pocket to the other.

The lower ends of the perforations H′ open into channels J within a heat-storage chamber or heat-reservoir formed between the sub-floor D and the base K of the kiln, this base forming, as it were, a third floor under the sub-floor D. The said heat-reservoir is divided into four sectors by diametrically located partitions L, L′ disposed directly under the main partitions E, E′ respectively. These partitions L, L′ are preferably solid, as shown, so that the several sectors of the heat-reservoir will not be in direct communication with each other, but, if desired, these partitions might be perforated, or even omitted. The heat-reservoir further contains checker-work partitions M, some parallel to the partition L, others to the partition L′, and still others to the outer wall A, these partitions M, together with the partitions L, L′ and with a block M′ of triangular or other suitable shape, forming the channels J. It will be noted that the partitions M and block M′ lie directly under some of the partitions extending between the main floor C and the sub-floor D, whereby a good support is obtained for said upper partitions and for the floor C. The lower partitions M do not correspond exactly to the upper ones, the main requirement, as regards the lower partitions L, L′, being that they shall form the channels J in proper position to communicate with the perforations H′. In the example shown, none of the straight lower partitions are continued to contact with the central partitions L, L′ or with the outermost curved lower partition M, but in the space between the sub-floor D and the main floor C, the upper partitions are so extended, so that the floor C may be supported properly at every point. The upper partitions, while they have been shown solid, might be made perforated; this applies to the partitions F, F′, F″, as well as to the main partitions E, E′, which latter might be omitted entirely, if desired, I prefer, however, to have solid partitions E, E′, F, F′, F″ as shown.

From points located preferably near the center of each of the curved channels J′ which are adjacent to the outer wall A, down-take flues N, which extend partly into the said wall A, and reach in said wall up to almost the level of the sub-floor D, extend to horizontal flues O located under the base K and converging toward a collecting chamber P disposed centrally under said base. This chamber may be of rectangular shape with arched top, as shown, the flues O communicating with the ends thereof, in pairs, while from the central portion of said collector a main smoke-flue Q, of properly increased cross section (relatively to that of the flues O) leads to the stack R. Fig. 1 shows that the roof of the collector P has the shape of a lean-to, that is, the roof rises continuously from one side of the collector to the other, and the smoke-flue Q is connected with the collector at that side where the lean-to roof is highest. It will also be noted that the flues O which convey the hot gases to the collector P, have their bottoms (and indeed their major portions) below the top of the smoke-flue Q, and this arrangement presents the advantage of considerably reducing the height of the collector and also the advantage of a more direct flow of the gases from the flues O to said smoke-flue. Any usual or approved devices may be provided in the stack or elsewhere in the kiln, for the purpose of regulating the draft.

When applying the construction just described, to new kilns, I prefer to make the outer wall A with inwardly-projecting portions or ledges a to support the floor C and sub-floor D. When remodeling an existing kiln to embody therein substantially the construction of Figs. 1 to 4, I could, as indicated in Fig. 11, build a supplemental wall S against the inner surface of the outer wall, said wall S being interrupted where the down-take flues N' are located, which flues in this case do not extend into the outside wall A. On top of this supplemental wall S I would lay the outer edge of the sub-floor D, and then I would build a continuous annular wall on top of the sub-floor, against the inner surface of the kiln wall A, on which continuous wall would rest the outer edge of the main floor C.

In operation, the heat produced in the furnaces A'' (whether these be located in the wall A or not, and whether they be above or below the level of the main floor C) passes through the bag-flues B into the interior of the kiln, near the roof thereof, and then travels downward, heating or "burning" the ware contained in the kiln chamber. The heat then passes out through the openings C' of the floor C into the channels or pockets G between the main floor C and the sub-floor D. It will be noticed that the openings C' are out of line with the perforations H', so that any sand or other loose material which may be present in the kiln chamber and carried along by the hot gases, or simply fall through said openings C', will not be able to follow the hot gases any farther, but will be caught by the sub-floor D at the bottom of each pocket G. The material thus arrested may be removed in any suitable way, as by removing the portion of the floor immediately above, or blowing out say with steam, by means of an appliance introduced through one of the floor openings C'. It will be understood that the kiln has suitable openings (not shown) for the introduction and removal of the ware to be treated. The drawing shows only one opening C' for each pocket G, but there might be a plurality of such openings to each pocket; however, in any event none of the openings C' should be directly above one of the perforations H'. The pockets G also form heat-storing chambers, for the purpose of better heating those contents of the kiln which are near the floor. Obviously, the gases are hottest in the upper portion of the kiln chamber, so that there is a tendency to heat the lower portion less. The heat stored in the pockets G, and also in the perforated or checker-work partitions M below the sub-floor D, serves to compensate for the gradual cooling of the gases as they travel downward in the kiln chamber, so that the ware near the floor will be heated practically to the same degree as the ware near the top. The straight partitions M preferably meet at right angles, to form L-shaped perforated, heat-retaining partitions which compel the gases to travel through a longer path, so as to obtain a better heating of the floor portion of the kiln by retaining the hot gases within the floor structure for a comparatively long time. The curved or arc-shaped partitions M act as a baffle to the heat in the neighborhood of the openings leading to the down-take flues N. The collector P, being of elongated form and therefore of substantial cross sectional area, need not be made very deep, which is an advantage where deep excavation is undesirable on account of the nature of the soil. It will be understood that the base K need not be a separate structure, but may be formed by the soil itself. In some cases, I may place an additional wall K' below the horizontal flues O, Q, but generally, I prefer to omit this wall K'. The arrangement of the down-takes N and channels J, J' insures a practically uniform distribution of the hot gases in the space between the sub-floor D and the base K.

Fig. 5 shows how the construction of Figs. 1 to 4 may be applied to a kiln of rectangular form. The same reference letters are applied to corresponding parts, and detailed description is therefore thought unnecessary. The upper partitions F are all parallel to each other and to the diametral or central partition E, which together with the other central partition E' divides the structure into four quadrants. The space between the sub-floor D and the base K contains only L-shaped partitions M of checker-work, and a solid partition or block M' of rectangular shape. The four flues O lead from the corners of the kiln to the centrally-located collector P, which in this case is shown as of equal width with the main smoke-flue Q. The operation and advantages will be the same as described above. Several sections of the character shown in Fig. 5 might be arranged end to end, without any intervening interior wall, that is to say, with a single interior kiln chamber. Similarly, the division of the kiln floor structure into four sectors or quadrants need not be adhered to, but the number of sectors or compartments may be increased or diminished, and this applies to the rectangular embodiment of my invention as well as to the circular form.

Figs. 6, 7, and 8 illustrate two forms of my invention in which the sub-floor D is dispensed with. According to Figs. 6 and 7, the partitions F, F', F'' are made of less height than in the form of my invention first described, and these partitions (preferably made of a single course of brick) rest directly on top of the checker-work partitions M and block M'. According to Fig. 8, the partitions F, F', F'' are omitted entirely, the perforated or checker-work partitions M extending up to contact with the main floor C. In this case, of course, the openings C' must be arranged in registry with the spaces between the partitions M, that is to say, in registry with the channels J, J'.

Instead of the bag-flues B employed in connection with the forms of my invention described above, I may adopt other ways of conveying the hot gases from the furnaces to the interior of the kiln. Thus, in Fig. 9 a continuous annular flash-wall B' extends within the kiln upwardly from the floor C (to a level corresponding to the upper ends of the bag-flues of, say, Fig. 1). The furnaces would discharge into the annular space formed between this wall B' and the surrounding wall A, it being understood that this space is open at the top to form an annular connection with the interior of the kiln, all around the periphery of the kiln chamber. This arrangement may be employed in certain cases, in the interest of a very uniform distribution of the hot gases in the upper portion of the kiln chamber.

In the constructions above referred to, the horizontal flues O, Q and the collector P are located entirely below the level of the base K. In some cases it may be desired to locate these parts at a somewhat higher level, and a construction embodying this feature has been shown in Fig. 10, where the upper portions of the flues O, Q and of the collector P are above the base K, the height of the partitions M being reduced at the points where the said parts O, P, Q are disposed.

It will be observed that after passing through the checker-work or perforated partitions M, the gases travel downward in the down-take flues N, thereby insuring an efficient passage of the gases through the lower portions or lower apertures of the checker-work as well as through the upper ones, so as to fully utilize the heat-storing capacity of the checker-work, and keep the floor C and the parts adjacent thereto, at a proper high temperature. This heating effect is further enhanced by the fact that the horizontal flues O, Q and the collector P are adjacent to the bottom of the heat-reservoir formed by the checker-work partitions M (and blocks M'), so that the gases, as they pass out through the flues O, collector P, and flue Q, will still heat the lower portion of the checker-work and of the entire floor-structure.

I have mentioned above that I may arrange the furnaces either below or above the level of the main floor C, and of course, if desired the furnaces might be located exactly at the level of said floor. It may be desirable to have the bottom of the furnaces (and therefore, the lower ends of the bag-flues B, or the lower end of the flash-wall B', in case the latter is substituted for bag-flues) level with the sub-floor D, or slightly above this sub-floor, yet below the main floor level. With this arrangement, a more energetic heating of the lower portion of the kiln can be obtained than when the furnaces and their connections to the inside of the kiln are entirely above the level of the main floor C.

Various modifications may be made without departing from the nature of my invention as set forth in the appended claims. It may be desirable to use more than one stack in which case stacks may be located, either within or exterior of the kiln wall, as shown in Fig. 12, one end of each stack R'' communicating, by means of an opening R' in kiln wall, with the space below floor D in substantially the same place as upper end of down take flue N. With this arrangement deep excavation is avoided.

I claim as my invention:

1. A kiln provided with a perforated floor, a checker-work heat-reservoir located below said floor and adapted to receive the hot gases passing through the perforations of the floor, a down-take located at the edge portion of the reservoir and forming an outlet therefor, and a flue connected with the lower portion of the down-take and having an imperforate upper wall extending along the lower portion of the heat-reservoir and in contact, throughout its length, with the bottom wall of said reservoir.

2. A kiln provided with a perforated floor, and a sub-floor located at a distance below said floor and provided with perforations out of line, vertically, with those of the said floor.

3. A kiln provided with a floor, a sub-floor located at a distance below said floor, both the floor and the sub-floor being perforated, the perforations of the sub-floor being out of vertical alinement with those of the floor above, and a heat-reservoir located under the sub-floor and communicating with the perforations thereof.

4. A kiln provided with a floor, a sub-floor located at a distance below said floor, both the floor and the sub-floor being perforated, the perforations of the sub-floor being out of vertical alinement with those of the floor above, and blocks located between the floor and the sub-floor and provided with openings in registry with those of the sub-floor and extending to within a distance from the floor.

5. A kiln provided with a perforated floor, a perforated sub-floor located at a distance below said floor, the perforations of the sub-floor being out of vertical alinement with those of the floor above, partitions located between the floor and sub-floor and forming channels communicating with the perforations of both, and blocks extending between said partitions from the sub-floor to within a distance from the floor above and having perforations in registry with those of the sub-floor.

6. A kiln provided with a perforated floor, a perforated sub-floor located at a distance below said floor, imperforate partitions located between the floor and sub-floor and forming channels communicating with the perforations of said floor and sub-floor, and heat-retaining checker-work located below the sub-floor.

7. A kiln provided with a perforated floor, a perforated sub-floor located at a distance below said floor, and perforated projections registering with the perforations of the sub-floor and extending therefrom to within a distance from the main floor above.

8. A kiln provided with a perforated floor, a perforated sub-floor, imperforate partitions located between the floor and the sub-floor and forming channels between them, and a heat-reservoir located below said sub-floor and communicating with the space between the floor and sub-floor.

9. A kiln provided with a collector located under the kiln floor and having a roof increasing in height from one side of the collector to the opposite side, a smoke-flue leading from that side of said collector at which its roof is highest, and means for conveying the hot gases from the interior of the kiln to said collector.

10. A kiln provided with a collector located under the kiln floor, a smoke-flue leading from said collector, and a flue for conveying the hot gases from the interior of the kiln to said collector, said last-named flue discharging into the collector at a level below the top of said smoke-flue.

11. A kiln provided with a collector located under the kiln floor, a flue for conveying the hot gases from the interior of the kiln to said collector, and a smoke-flue leading from said collector and having its top at a level above the bottom of the first-named flue, both flues having their collector openings located at least partly at the same level, and the roof of the collector being inclined, and highest at the side from which the smoke-flue leads.

In testimony whereof, I have signed this specification.

HARFORD P. JENKS.